United States Patent
Prange

Patent Number: 6,000,116
Date of Patent: Dec. 14, 1999

[54] ADVANCED FIN POSITIONER

[75] Inventor: Robert Harvey Prange, Greer, S.C.

[73] Assignee: Owens Corning Fiberglas Technology, Inc., Summit, Ill.

[21] Appl. No.: 09/108,615

[22] Filed: Jul. 1, 1998

[51] Int. Cl.⁶ .................................................. B21D 39/00
[52] U.S. Cl. .............................................. 29/456; 65/511
[58] Field of Search ................................ 29/456; 65/511, 65/512

[56] References Cited

U.S. PATENT DOCUMENTS

| | | |
|---|---|---|
| 3,150,946 | 9/1964 | Russell . |
| 3,522,025 | 7/1970 | Smith . |
| 3,997,309 | 12/1976 | Harris . |
| 4,325,722 | 4/1982 | Jensen . |
| 4,356,016 | 10/1982 | Brosch et al. . |
| 4,398,933 | 8/1983 | Lecros et al. . |
| 4,541,853 | 9/1985 | Sullivan et al. . |
| 4,566,891 | 1/1986 | Briar et al. . |
| 4,571,251 | 2/1986 | Sullivan et al. . |
| 5,244,483 | 9/1993 | Brosch et al. . |
| 5,709,727 | 1/1998 | Bobba . |

FOREIGN PATENT DOCUMENTS 270969  12/1968  U.S.S.R. .

*Primary Examiner*—P. W. Echols
*Assistant Examiner*—John C. Hong
*Attorney, Agent, or Firm*—Inger H. Eckert

[57] ABSTRACT

An advanced fin positioner for operatively mounting a finshield assembly having cantilevered therefrom a plurality of cooling fins and for facilitating selective positioning of the finshield assembly with respect to a bushing tip plate of a glass fiber forming apparatus. The advanced fin positioner including a body member, nut block and compound lead screw. The body member is releasably attached to a mounting bracket connected to a bushing frame of the glass fiber forming apparatus and has slidably attached thereto at least one slide arm including a vertically extending slot. The nut block is operatively attached to the finshield assembly and to the at least one slide arm and constrained for vertical movement by the slot along the body member. The compound lead screw is operatively connected to the body member and the nut block such that by rotating the compound lead screw, the body member and the nut block act against each other causing the nut block and the finshield assembly to move.

17 Claims, 2 Drawing Sheets

ADVANCED FIN POSITIONER

TECHNICAL FIELD AND INDUSTRIAL APPLICABILITY OF THE INVENTION

The present invention relates to an advanced fin positioner for use with a glass fiber forming apparatus and a method of using the advanced fin positioner. More particularly, the present invention relates to an advanced fin positioner used to operatively mount a finshield assembly having cantilevered cooling fins and facilitate selective positioning of the finshield assembly with respect to the bushing tip plate of a glass fiber forming apparatus and a method of using the advanced fin positioner.

BACKGROUND OF THE INVENTION

In the production of glass fiber filaments, it is well known to flow molten glass from a suitable source into a bushing assembly. A bushing assembly is generally an elongated channel having side and end walls and a generally planar bottom which includes a large number of nozzles or tips through which the molten glass passes. In the zone immediately below these tips, the molten glass is formed into filaments, which normally then have a sizing applied to them and are gathered into a strand, and wound onto a package.

The environment in the zone immediately below the tip plate is crucial in the formation of the filaments because it is this area that the molten glass cools and changes into the filaments. For example, it will be appreciated that temperature fluctuations in this zone will result in diameter variations in the strands. Filaments subjected to more rapid cooling in one portion of the zone than in another portion of the zone will have larger diameters and may not withstand the gathering and winding forces applied to them causing breakage of the filament. Conversely, filaments which are undercooled may break due to instability.

The tip plate and molten glass is cooled by a finshield assembly including cantilevered cooling fins. The finshield assembly is located beneath the bushing tip plate and frequently must be taken down from its use location for cleaning, repair, or for adjustment of the fin geometry caused by tip plate deformation or warping. The means for securing the finshield assembly and cooling fins to the bushing must be secure yet quickly releasable. A generally permanent nut and bolt connection is usually not suitable for this application since such a connection would not be quickly and readily undone. The high operating temperature in the glass fiber forming area in combination with the glass volatiles that are released during glass fiber formation, together with the presence of cooling water sprays and the like combine to render a conventional nut and bolt attachment of the finshield assembly to the bushing assembly unacceptable.

In addition, to the requirement for precise control of the temperature environment in the formation of glass filaments and easy attachment of the finshield assembly, it will be further appreciated that stray air currents can also carry unwanted materials into the zone thereby breaking the filaments and decreasing production efficiency.

For a more detailed description of the operating environment and construction of a glass fiber forming apparatus, reference is made to U.S. Pat. Nos. 4,325,722; 4,391,618 and 4,566,891, incorporated herein by reference.

In view of the foregoing, it will be appreciated that there is a need for effective control of the environment in the zone directly beneath the tip plate. An object of the present invention is to provide an advanced fin positioner to operatively control the position of the finshield assembly. Another object of the present invention is to provide an advanced fin positioner that is compact in design. Yet another object of the present invention is to provide an advanced fin positioner of a modular design for easy rebuild or repair. Still another object of the present invention is to provide an advanced fin positioner that is capable of operating at temperatures of 600 degrees fahrenheit without warpage. Another object of the present invention is to provide an advanced fin positioner that is simple and economical to manufacture.

SUMMARY OF THE INVENTION

Briefly, according to this invention there is provided an advanced fin positioner for operatively mounting a finshield assembly having cantilevered therefrom a plurality of cooling fins and for facilitating selective positioning of the finshield assembly with respect to a bushing tip plate of a glass fiber forming apparatus. The advanced fin positioner includes a body member and a nut block. The body member is releasably attached to a mounting bracket that is connected to a bushing frame of the glass fiber forming apparatus. The body member has attached thereto at least one slide arm including a vertically extending slot. The nut block is operatively attached to the finshield assembly and to the at least one slide arm and constrained for vertical movement by the slot. A compound lead screw operatively connects the body member and the nut block such that by rotating the compound lead screw, the body member and the nut block act against each other causing the nut block and the finshield assembly to move.

BRIEF DESCRIPTION OF THE DRAWINGS

Further features and other objects and advantages of this invention will become clear from the following detailed description made with reference to the drawings in which.

DETAILED DESCRIPTION AND PREFERRED EMBODIMENTS OF THE INVENTION

Figure 1:
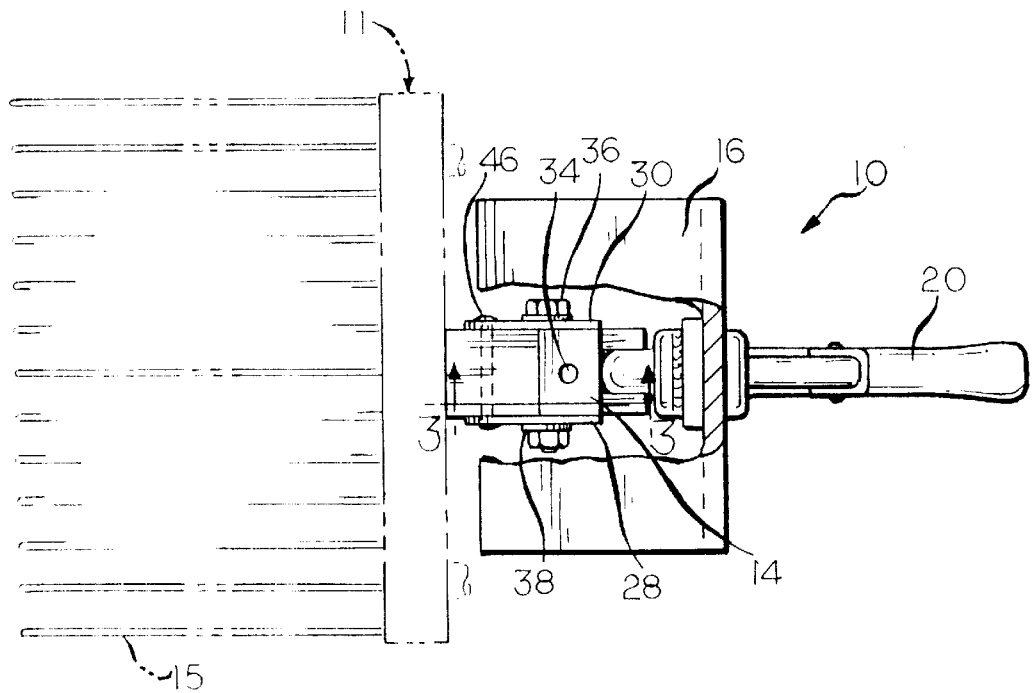
FIG. 1 is a top view of an advanced fin positioner in accordance with the present invention.

In the following description, like reference characters designate like or corresponding parts. Also in the following description, it is to be understood that such terms as "horizontal", "vertical", "left", "right" and the like, are words of convenience and are not to be construed as limiting terms apart from the invention as claimed. Referring to the drawings, there is shown an advanced fin positioner 10 for use with a glass fiber forming apparatus of a type well known in the art. The advanced fin positioner 10 is used to operatively mount a finshield assembly 11 and facilitate selective positioning of the finshield assembly with respect to a bushing tip plate 13 of a glass fiber forming apparatus. As well known in the art, the finshield assembly 11 includes a plurality of cooling fins 15 which extend in a cantilevered manner between rows of tips beneath the bushing tip plate 13 that is contained by a conventional bushing frame secured by clamps to a forehearth as well known in the art. The finshield assembly 11 provides a cooling function for removing heat from the tip plate 13 and the glass fiber filaments formed by the tips.

Figure 2:
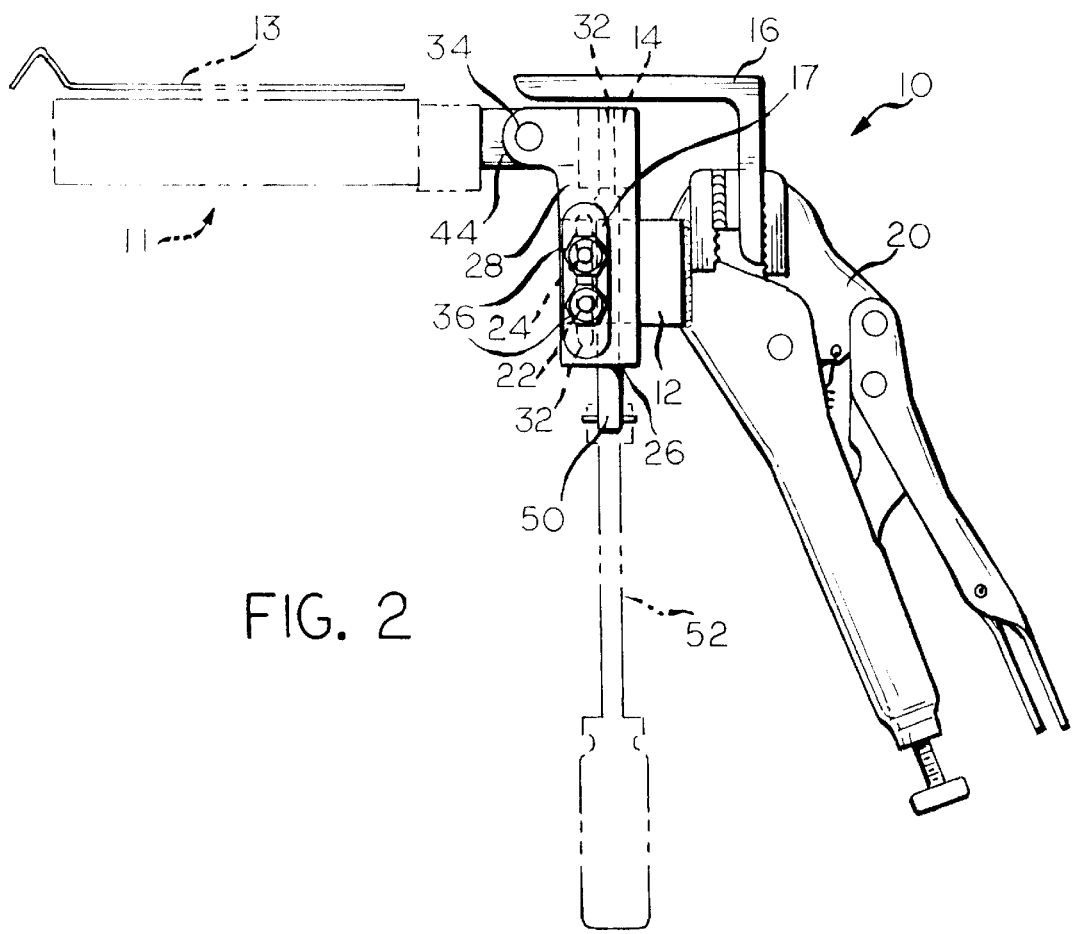
FIG. 2 is a side view of the advanced fin positioner of FIG. 1 including an adjustment tool.
Figure 3:
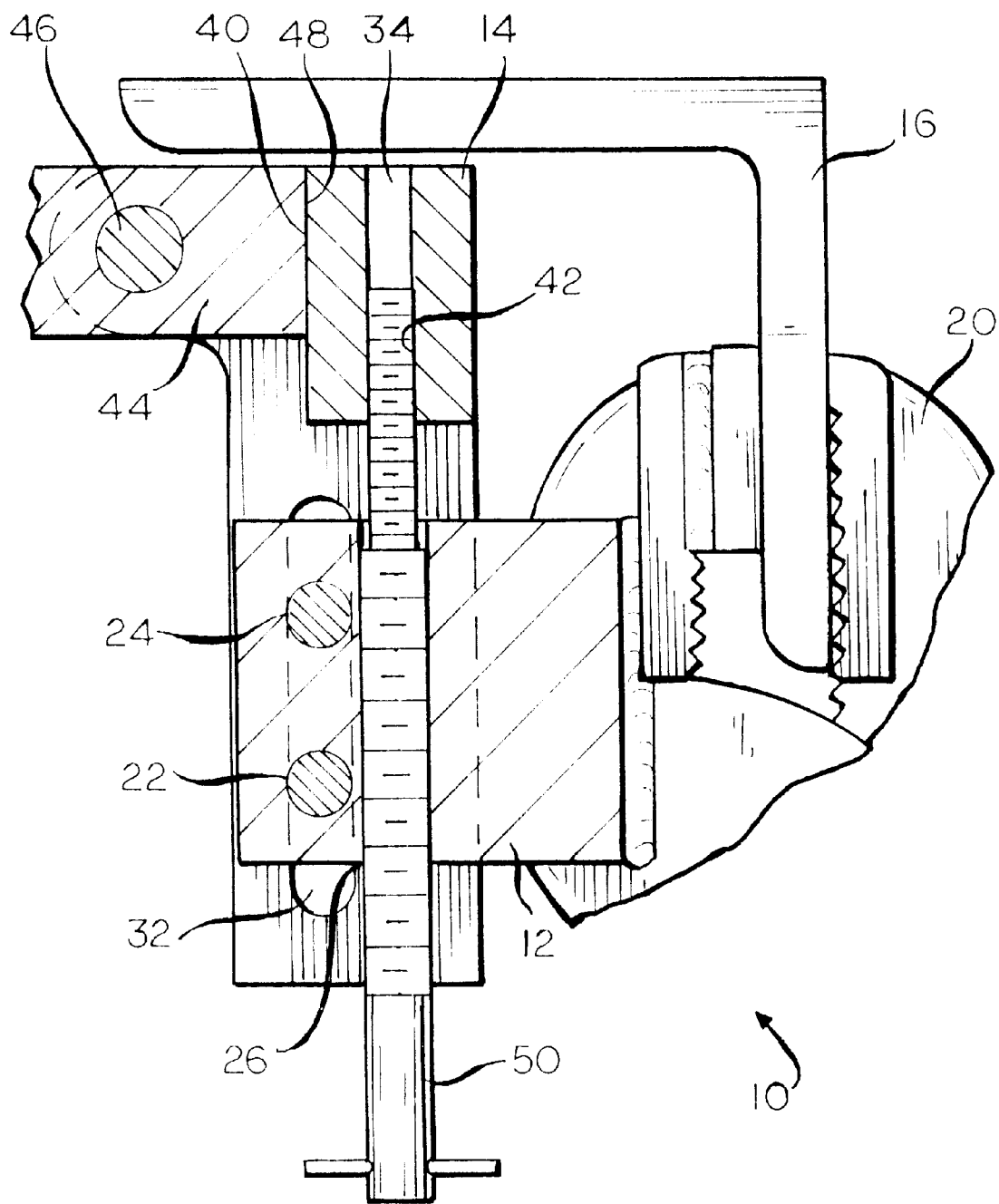
FIG. 3 is an enlarged partial cross-sectional view of the advanced fin positioner.

As shown in FIGS. 1–3, the advanced fin positioner 10 includes a body member 12 and a nut block 14. The body member 12 is releasably attached to a mounting bracket 16 which is operatively connected to a bushing frame of the glass fiber forming apparatus. The body member 12 is releasably attached to the mounting bracket 16 by a clamp 20. The clamp 20 may be of most any suitable design to allow for easy and secure attachment to the mounting bracket 16. In a preferred embodiment, the clamp 20 may be a commercially available vice-grip. The vice-grip may be securely attached to the body member 12 such as by welding and the like.

The body member 12 is a general C-shaped block having a pair of horizontal openings 22 and 24 and a vertically extending threaded opening 26. The body member 12 is positioned adjacent and attached to at least one slide arm 28 and 30. Although the invention is shown with two slide arms 28 and 30 and it is thus described herein. However, it will be readily apparent that the two slide arms 28 and 30 may be replaced with one member capable of functioning as two slide arms, and the description of the same in relation to two slide arms is not to be construed as a limitation on the scope of the invention. Each slide arm 28 and 30 is of an inverted L-shape and includes a longitudinal slot 32 along the vertical member of the L-shape and an opening 34 within the horizontal member of the L-shape. The slide arms 28 and 30 are attached to a finshield assembly attachment member 44 extending from the finshield assembly by a pin 46 inserted through horizontally aligned openings 34 within each slide arm 28 and 30 and opening within the finshield assembly attachment member 44.

At least one shoulder bolt 36 is inserted through the slot 32 within the slide arm 28, through the horizontal opening 22 and/or 24 and out the opposing slot 32 within the slide arm 30. A faceplate 17, nut and washer 38 are attached to the shoulder bolt 36 thereby restraining the movement of the slide arms 28 and/or 30 a and nut block 14 with respect to the body member 12.

Secured between the slide arms 28 and 30 and above the body member 12 is the nut block 14. In a preferred embodiment, the nut block 14 may be secured between the slide arms 28 and 30 by welding and the like. The nut block 14 is a solid member having a vertical bearing surface 40 and a threaded opening 42 in vertical alignment with the threaded opening 26 of the body member 12. A leading end 48 of the finshield assembly attachment member 44 abutts against the vertical bearing surface 40 thereby fixing the relative position of the finshield assembly with respect to the nut block 14.

The advanced fin positioner 10 includes a compound lead screw 50. The compound lead screw 50 is threaded through the body member 12 and the nut block 14 thereby operatively connecting the body member and the nut block. With the shoulder bolts 36 securely tightened, rotation of lead screw 50 will cause the body member 12 and the nut block 14 to act against each other and slide the nut block and slide arms 28 and 30 vertically along the slot 32 thereby causing an unusually fine movement or pitch of the finshield assembly 11 nearer or farther away from the bushing tip plate for the purpose of yardage control.

The compound lead screw 50 may be turned manually or by using a tool 52. In a preferred embodiment, as shown in FIG. 2, the compound lead screw is adjusted by a long handle tool 52 having a female socket end adapted to receive an end of the compound lead screw 50. It will be appreciated that the tool 52 allows for quick and easy access to the compound lead screw 50.

In the operation of a glass fiber forming bushing, it is important that the operator be able to observe the tips of the bushing assembly. Such observation is necessary to allow the operator to see any broken filaments or tips where globs of glass are forming. This visual observation cannot be compromised by the addition of ancillary devices. Since the advanced fin positioner 10 of the present invention is easily and quickly removed and is attached to the finshield assembly 11, it does not seriously obstruct the operator's view. Furthermore, the advanced fin positioner 10 can be implemented into existing production facilities and will perform its desired environment control functions without interfering with the operator's access to the bushing.

By use of the advanced fin positioner 10, in accordance with the present invention, the glass fiber filament forming properties of the bushing are enhanced, the filaments are formed in a more uniform manner, and the region around the filament is maintained with less extraneous debris. Furthermore, the operator's access to the tip plate is not compromised and the system can be used with existing production facilities.

The patents and documents described herein are hereby incorporated by reference in their entirety.

With respect to the above description, it is to be realized that the optimum dimensional relationships for the parts of the invention, to include variations in size, materials, shape, form, function and manner of operation, assembly and use, are deemed readily apparent once the invention is disclosed and explained, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed is:

1. An advanced fin positioner for operatively mounting a finshield assembly having cantilevered therefrom a plurality of cooling fins and for facilitating selective positioning of the finshield assembly with respect to a bushing tip plate of a glass fiber forming apparatus comprising:

a body member releasably attached to a mounting bracket connected to a bushing frame of the glass fiber forming apparatus, the body member having slidably attached thereto at least one slide arm including a vertically extending slot;

a nut block operatively attached to the finshield assembly and to the at least one slide arm and constrained for vertical movement by the slot along the body member; and a compound lead screw operatively connecting the body member and the nut block such that by rotating the compound lead screw, the body member and the nut block act against each other causing the nut block and the finshield assembly to move.

2. The advanced fin positioner of claim 1 wherein the body member is releasably attached to the mounting bracket by a clamp.

3. The advanced fin positioner of claim 2 wherein the clamp is a vice-grip.

4. The advanced fin positioner of claim 3 wherein the vice-grip is securely attached to the body member by welding.

5. The advanced fin positioner of claim 2 wherein the body member includes a vertical threaded opening.

6. The advanced fin positioner of claim 5 wherein the body member has attached thereto two slide arms.

7. The advanced fin positioner of claim 6 wherein each slide arm is of an inverted L-shape and includes a longitudinal slot within the vertical member of the L-shape and an opening within the horizontal member of the L-shape.

8. The advanced fin positioner of claim 5 wherein the slide arms are attached to a finshield assembly attachment member extending from the finshield assembly by a pin inserted through horizontally aligned openings within each slide arm and boogie member.

9. The advanced fin positioner of claim 8 wherein the nut block is secured to at least one slide arm above the body member.

10. The advanced fin positioner of claim 9 wherein the nut block is secured to at least one slide arm by welding.

11. The advanced fin positioner of claim 10 wherein the nut block includes a vertical bearing surface and a threaded opening vertical alignment with the threaded opening of the body member, wherein a leading end of the finshield assembly attachment member abutts against the vertical bearing surface thereby fixing the relative position of the finshield assembly with respect to the nut block.

12. The advanced fin positioner of claim 11 wherein the compound lead screw is threaded through the body member and the nut block thereby operatively connecting the body member and the nut block.

13. An advanced fin positioner for operatively mounting a finshield assembly having cantilevered therefrom a plurality of cooling fins and for facilitating selective positioning of the finshield assembly with respect to a bushing tip plate of a glass fiber forming apparatus comprising:

a body member releasably attached to a mounting bracket connected to a bushing frame of the glass fiber forming apparatus, the body member including a vertical threaded opening and having slidably attached thereto two slide arms, each slide arm including a vertically extending slot;

a nut block including a vertical threaded opening axially aligned with the threaded opening of the body member and operatively attached to the finshield assembly and to each slide arm and constrained for vertical movement by each slot along the body member; and a compound lead screw operatively connecting the body member and the nut block such that by rotating the compound lead screw, the body member and the nut block act against each other causing the nut block and the finshield assembly to move.

14. The advanced fin positioner of claim 13 wherein the clamp is a vice-grip.

15. The advanced fin positioner of claim 14 wherein the vice-grip is securely attached to the body member by welding.

16. The advanced fin positioner of claim 13 wherein the slide arms are attached to a finshield assembly attachment member extending from the finshield assembly by a pin inserted through horizontally aligned openings within each slide arm and finshield assembly attachment member.

17. A method for operatively mounting a finshield assembly having cantilevered therefrom a plurality of cooling fins and for facilitating selective positioning of the finshield assembly with respect to a bushing tip plate of a glass fiber forming apparatus, the method comprising the steps of:

providing an advanced fin positioner including a body member, nut block and compound lead screw, the body member releasably attached to a mounting bracket connected to a bushing frame of the glass fiber forming apparatus, the body member having slidably attached thereto at least one slide arm including a vertically extending slot, the nut block operatively attached to the finshield assembly and to the at least one slide arm, and the compound lead screw operatively connected to the body member and the nut block; and rotating the compound lead screw such that the body member and the nut block act against each other causing the nut block and the finshield assembly to move.

* * * * *